Patented Jan. 14, 1936

2,027,466

UNITED STATES PATENT OFFICE 2,027,466

COMPOSITION CONTAINING CASTOR OIL DERIVATIVE

Merlin Martin Brubaker, Wilmington, Del., assignor to E. I. du Pont de Nemours & Company, Wilmington, Del., a corporation of Delaware No Drawing. Application April 11, 1932, Serial No. 604,666

9 Claims. (Cl. 134—26)

This invention relates to film forming compositions and more particularly to improved cellulose derivative compositions.

Pyroxylin films are brittle and in order to overcome this difficulty various softening agents have been added to nitrocellulose coating compositions for the purpose of imparting flexibility to the films resulting from these coating compositions. I have found, however, that certain derivatives of hydrogenated castor oil furnish improved softening agents. The use of the acetyl derivative of hydroxystearin (the main constituent of hydrogenated castor oil) as a softening agent has been proposed, but insofar as I am aware the improved products resulting from the esterification of hydrogenated castor oil with acids of the type disclosed herein, are new.

This invention has as an object the production of new and useful compositions of matter. A further object is to provide nitrocellulose coating compositions in which these esters are incorporated for the purpose of yielding films which will not become rancid with age, will retain their flexibility upon aging, and which have a high exudation temperature.

The above objects are accomplished by the following invention in which an oily softener consisting of the product obtained by reacting hydrogenated castor oil with organic polybasic acids in such proportion as to yield a product soluble in organic solvents.

Castor oil consists chiefly (about 85%) of the tri-glyceride of ricinoleic acid, which may be expressed by the following formula:

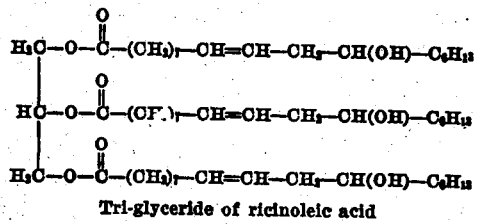

Tri-glyceride of ricinoleic acid

Castor oil turns rancid because of oxidation which occurs at the double bonds and when such rancidification occurs, a brittleness of the pyroxylin film softened with castor oil develops. Removal of the double bonds by hydrogenation, which may be effected in the known manner by using a nickel catalyst below 200° C., converts the triglyceride of ricinoleic acid into the triglyceride of hydroxy stearic acid:

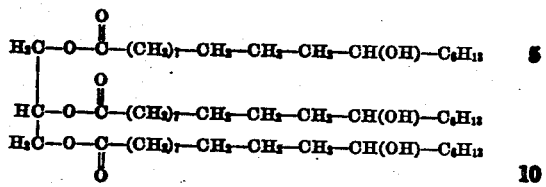

Tri-glyceride of hydroxy stearic acid

This product, however, is a hard white wax melting at 86° C. and incompatible with nitrocellulose. Hydrogenated castor oil cannot, therefore, without further modification, be used as a film softening agent. This material still contains the hydroxyl groups originally present in the ricinoleic acid molecule, and I have discovered that when these hydroxyl groups are esterified with organic polybasic acids, as described herein, liquid to resinous products result which are readily compatible with nitrocellulose.

I have found that very valuable softening agents for nitrocellulose films may be obtained by esterifying hydrogenated castor oil, i. e., the tri-glyceride of hydroxy stearic acid, with aromatic or aliphatic diabasic acids in particular, as exemplified by the following examples.

Example I

A mixture of 700 parts of hydrogenated castor oil and 144 parts of phthalic anhydride is heated with or without blowing or stirring at 255° C. for 7½ hours, or until the acid number has reached a value of, roughly, 10.0. The final product is a light brown moderately viscous oil. It may be used as such in coating compositions without further purification.

Example II

A mixture of 700 parts of hydrogenated castor oil and 115 parts of succinic acid is heated with or without stirring or blowing at 225° C. for 8½ hours, or until the acid number has reached a value of, roughly, 25.0. The product is a very viscous liquid. It may be used as such without further purification.

In like manner the esterification may be conducted with polybasic acids other than those mentioned in Examples I and II. Other examples of suitable polybasic aromatic acids are trimesic, salicyl-acetic, chlorophthalic, trimellitic, naphthalic, and diphenic acids. Further examples of other suitable aliphatic polybasic acids are citric, tartaric, fumaric, dilactylic, tricarballyic and sebacic acids. In general, all polybasic carboxylic acids whether aromatic, aliphatic or heterocyclic, e. g. quinolinic, may be used. I desire it to be understood that the polybasic acids referred to in the claims include either the acid or the anhydride thereof.

Although these esters are most conveniently prepared by heating the hydrogenated castor oil with the acid, any of the well known methods of esterification may be used, as for instance by reacting the hydrogenated castor oil with an acyl halide or an acid anhydride. Furthermore, the hydrogenated castor oil may be esterified with mixtures of different polybasic acids, or with mixtures of mono and polybasic acids, and the esterification may be carried out in the presence of a non-reactive solvent, as in my co-pending application (Serial No. 421,585 filed January 17, 1930). In general the reaction may be carried out at temperatures between 150° and 275° C. but it is preferred to operate at 210–250° C. Furthermore these esters can be prepared by the hydrogenation of polybasic acid esters of castor oil which may be done in solution, e. g. in decalin, if necessary.

A typical example of a nitrocellulose composition containing my improved softeners and suitable for use in coating fabrics for the preparation of artificial leather is as follows:

Example III

| | Parts by weight |
|---|---|
| Nitrocellulose (10 seconds viscosity) | 1 |
| Phthalate of hydrogenated castor oil | 1.50 |
| Pigment | 1 |
| Solvent | 4.25 |

A lacquer, for wood, metal, etc., is as follows:

Example IV

| | Parts by weight |
|---|---|
| Nitrocellulose (½ second viscosity) | 12 |
| Damar gum | 3 |
| Dibutyl phthalate | 4 |
| Phthalate of hydrogenated castor oil | 2.6 |

In these examples the softening agent indicated may be replaced with other polybasic acid derivatives of hydrogenated castor oil, such as the succinic acid derivative of Example II.

For use as softeners in films for artificial leather coatings, the esters of aliphatic polybasic acids produce films having relatively high exudation temperatures. While the softening agents produced from the polybasic aromatic acids do not yield films having as high an exudation temperature as those produced with aliphatic acids, the aromatic acids do, however, produce softening agents, which, because of their higher viscosity, lend toughness to the nitrocellulose film. The viscosity and consequent toughening property increases in general with the basicity of the acid, the tribasic acids, for example, being more effective in this respect than the dibasic acids. In nitrocellulose coatings for artificial leather, increase in viscosity is, however, undesirable beyond a certain point and the dibasic acids as esterifying agents are preferred as a rule.

Mixtures of the various softening agents can be used and different ratios of softener, pyroxylin, pigment and gum may be used in the coating compositions as will be readily understood by those skilled in the art.

The present invention finds its most important use in the preparation of such compositions as are used in the coating of fabrics for the production of artificial leather.

As softeners in less flexible lacquers and enamels, such as those used on metal or wood surfaces etc., we may use the more viscous products, or certain of the esters not so desirable in artificial leather coatings. Obviously, many other uses will suggest themselves to those skilled in the art, such as adhesives, lubricants, fluids for hydraulic shock absorbers, and impregnating agents for paper, fabric and other porous materials.

In many cases it will be found that esterification with polybasic acids, if carried too far, will produce gelled or insoluble products; these are unsuitable for the purpose of the present invention. The gelation can be avoided by heating at a lower temperature for a shorter period of time, or by including monohydric alcohols and/or monobasic acids as additional reaction components.

Films flowed from nitrocellulose coating compositions containing my improved softening agents have been found to withstand, after aging, either the same number of bends, or a greater number than they would initially and no rancidity development could be detected after aging. In certain of these softeners greater toughness and a higher exudation temperature is imparted to the pyroxylin film. The exudation temperature of the film is as great as, and is usually greater than, one in which castor oil is the softener.

The present invention is distinguished from the application of L. P. Hubbuch, Serial No. 604,670, now Patent 2,015,145 and from my application, Serial No. 604,665, filed of even date herewith in that both of these applications require the use of a polyhydric alcohol, the former application claiming monobasic acid esters of alcoholized hydrogenated castor oil, or more specifically monobasic acid esters of mono and/or diglycerides of hydrogenated castor oil, the latter application claiming hydrogenated fatty oil modified polyhydric alcohol-polybasic acid resins produced by reacting a polyhydric alcohol, hydrogenated fatty oil, and a polybasic acid.

Altho the use of our new esters has been described with particular reference to nitrocellulose, other cellulose derivatives such as the acetate, propionate, aceto-butyrate, the ethyl or benzyl ethers, etc., may be used with these new products in coating, plastic, impregnating, or adhesive compositions.

As many apparently widely different embodiments of this invention may be made without departing from the spirit and scope thereof, it is to be understood that I do not limit myself to the specific embodiments thereof except as defined in the following claims:

I claim:

1. A composition of matter comprising a cellulose derivative and the oily reaction product of polycarboxylic acid and hydrogenated castor oil consisting essentially of hydroxy stearin.

2. A composition of matter comprising a cellulose derivative and the oily reaction product of a dicarboxylic acid and hydrogenated castor oil consisting essentially of hydroxy stearin.

3. A composition of matter comprising a cellulose derivative and the oily reaction product of phthalic acid and hydrogenated castor oil consisting essentially of hydroxy stearin.

4. A composition of matter comprising a cellulose derivative and the oily reaction product of an aliphatic discarboxylic acid and hydrogenated castor oil consisting essentially of hydroxy stearin.

5. A composition of matter comprising a cellulose derivative and the oily reaction product of succinic acid and hydrogenated castor oil consisting essentially of hydroxy stearin.

6. The composition set forth in claim 1 in which the cellulose derivative is nitrocellulose.

7. The composition set forth in claim 2 in which the cellulose derivative is nitrocellulose.

8. The composition set forth in claim 3 in which the cellulose derivative is nitrocellulose.

9. The composition set forth in claim 5 in which the cellulose derivative is nitrocellulose.

MERLIN MARTIN BRUBAKER.

CERTIFICATE OF CORRECTION.

Patent No. 2,027,466.  January 14, 1936.

MERLIN MARTIN BRUBAKER.

It is hereby certified that error appears in the printed specification of the above numbered patent requiring correction as follows: Page 1, second column, line 34, for the numeral "255" read 225; and that the said Letters Patent should be read with this correction therein that the same may conform to the record of the case in the Patent Office.

Signed and sealed this 21st day of April, A. D. 1936.

Leslie Frazer (Seal)  Acting Commissioner of Patents.